Sept. 11, 1951 T. O. STRAUSS 2,567,498
CENTERING DEVICE
Filed Oct. 29, 1945 4 Sheets-Sheet 1

Inventor
Theodore O. Strauss.
By Cushman Darby & Cushman
Attorneys:

Sept. 11, 1951  T. O. STRAUSS  2,567,498
CENTERING DEVICE
Filed Oct. 29, 1945  4 Sheets-Sheet 2

Inventor
Theodore O. Strauss.
by Cushman Darby & Cushman
Attorneys:

Sept. 11, 1951     T. O. STRAUSS     2,567,498
CENTERING DEVICE

Filed Oct. 29, 1945     4 Sheets-Sheet 3

Inventor
Theodore O. Strauss
By Cushman Darby & Cushman
Attorneys

Sept. 11, 1951  T. O. STRAUSS  2,567,498
CENTERING DEVICE
Filed Oct. 29, 1945  4 Sheets-Sheet 4

Inventor
Theodore O. Strauss

By Cushman Darby & Cushman
Attorneys

Patented Sept. 11, 1951

2,567,498

UNITED STATES PATENT OFFICE 2,567,498

CENTERING DEVICE

Theodore O. Strauss, New York, N. Y.

Application October 29, 1945, Serial No. 625,208

12 Claims. (Cl. 279—6)

This invention relates to chuck holders for use with machines such as lathes, screw machines, drilling machines and the like and has as a principal object to provide means and method whereby a chuck can be quickly and accurately centered.

It is a well known fact that chucks seldom are exactly on center and hitherto the truing of the chuck has been accomplished with considerable difficulty and loss of time. In accordance with the present invention, rotary driving and driven parts of the holder are in spring-maintained frictional relation permitting restrained universal radial displacement of the driven member, which carries the chuck, so that by applying radial pressure to a cylindrical surface of a piece engaged in the chuck, centering can be accomplished in a matter of seconds and the parts then locked together.

Figure 1:
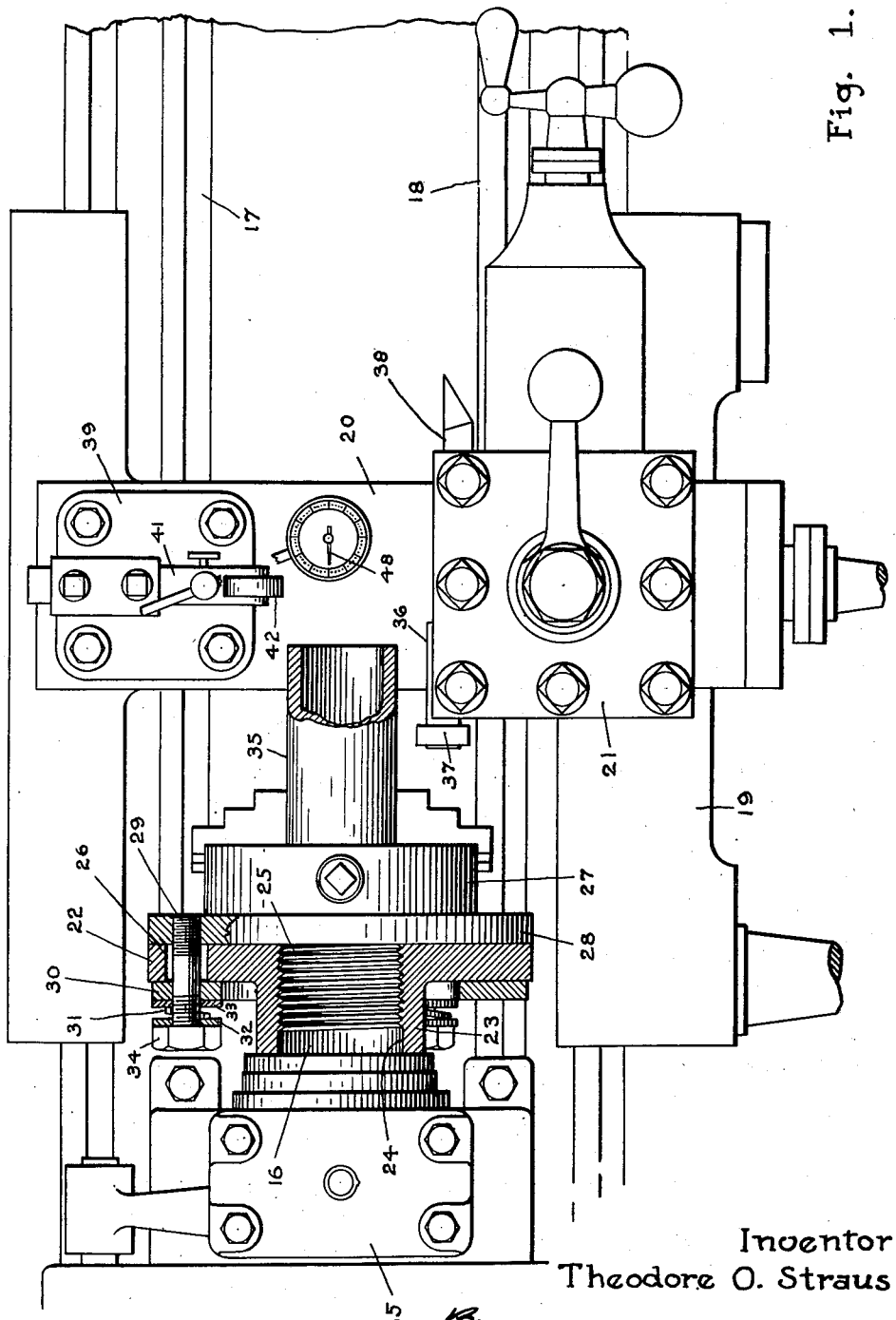
Figure 9:
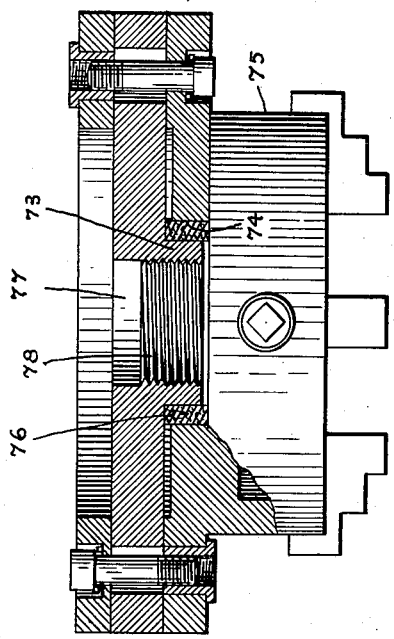
Figure 2:
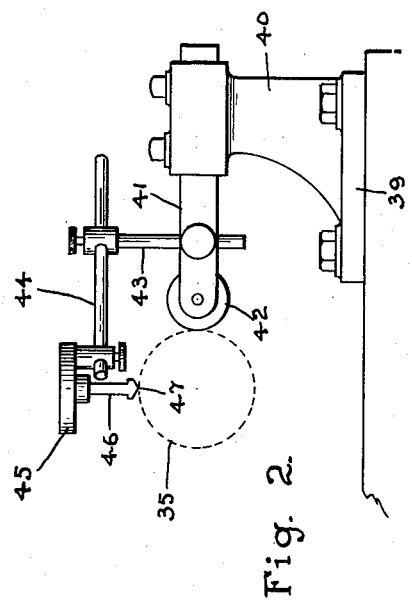
Figure 10:
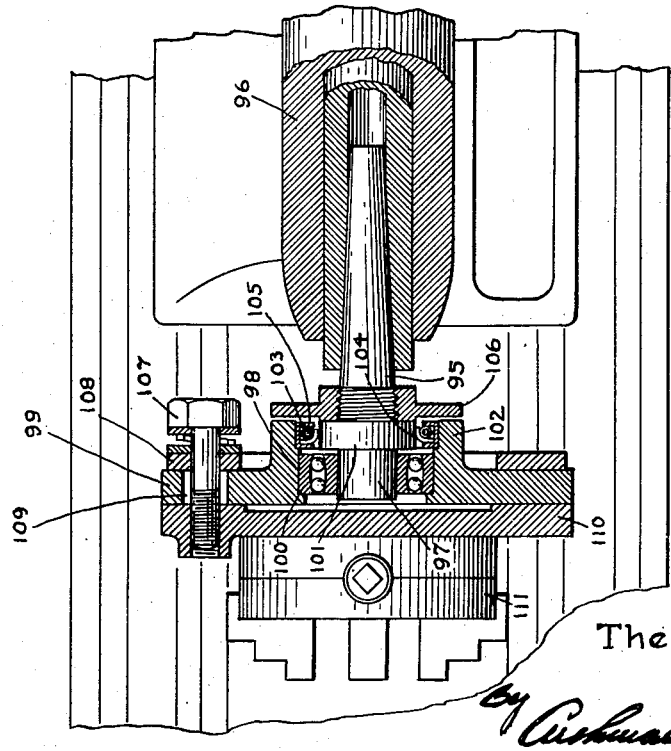
Figure 3:
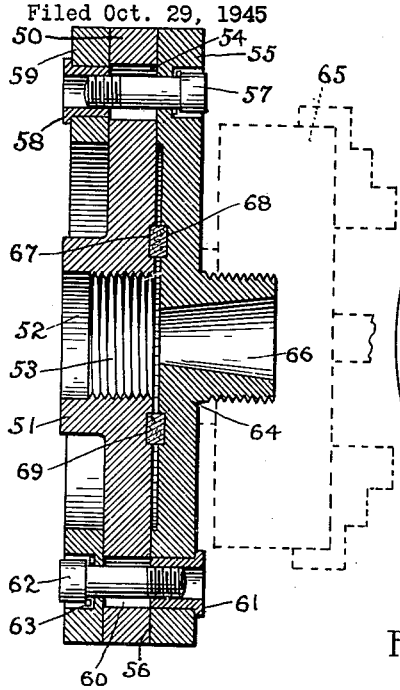
Figure 4:
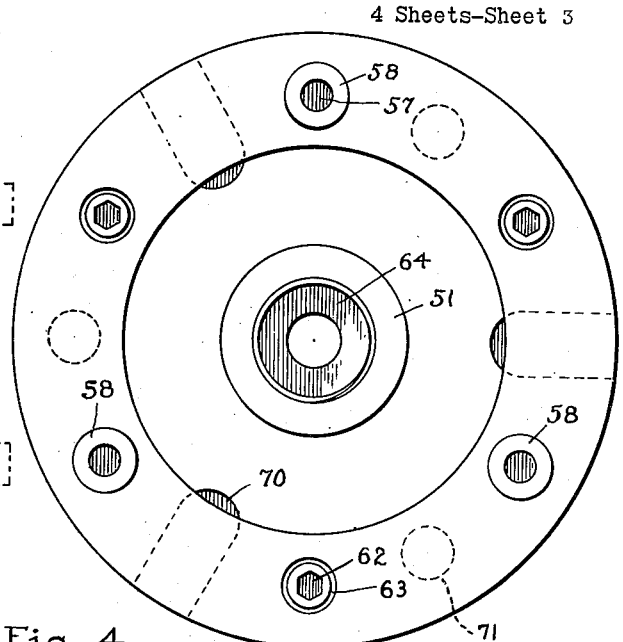
Figure 6:
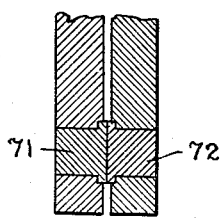
Figure 5:
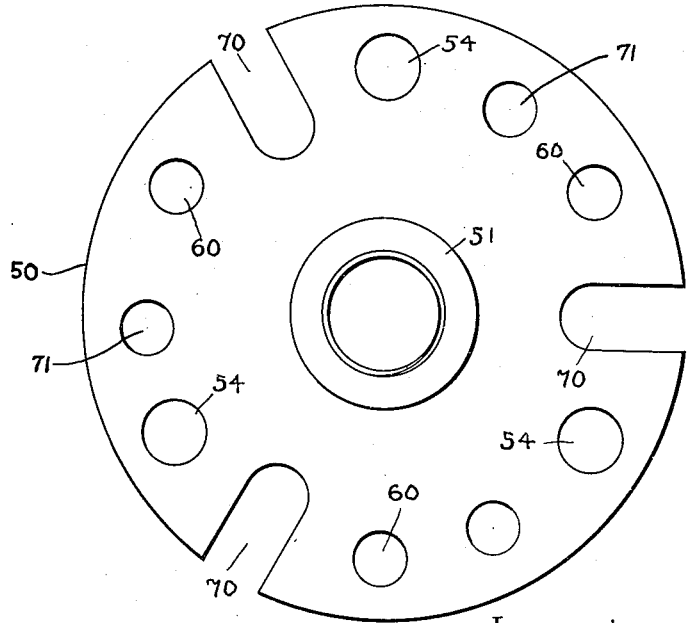
Figure 7:
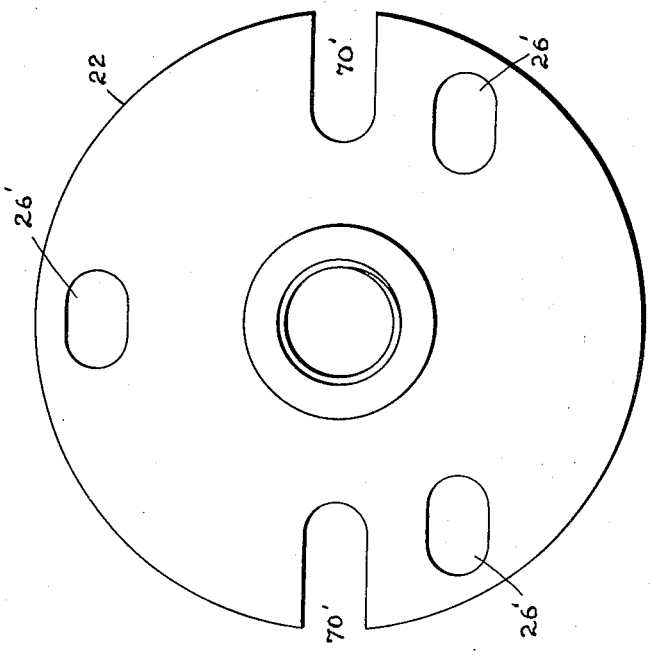
Figure 8:
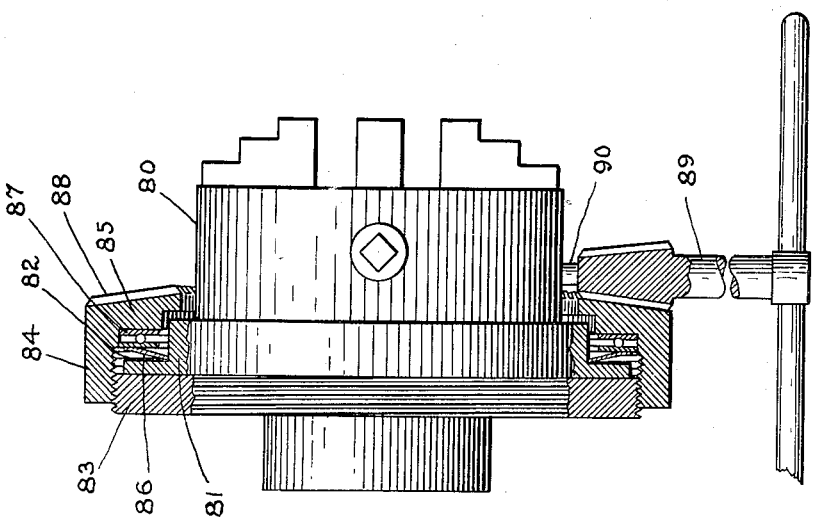

In the accompanying drawings,

Figure 1 is a partial plan view of a lathe equipped with a holder in accordance with the invention and with chuck centering means, Figure 2 is an elevation of chuck centering means which appear in Figure 1, Figure 3 is an axial section of another form of holder, Figure 4 is an elevation of the holder of Figure 3 as seen from the left of the latter figure, Figure 5 is an elevation of a plate member constituting part of the unit shown in Figures 3 and 4, Figure 6 is a partial axial section of a holder showing a modification, Figure 7 is an elevation of a plate like that of Figure 5 showing a modification, Figure 8 is an elevation partly in section of another embodiment, Figure 9 is an elevation partly in section of a further modified form of holder, and Figure 10 is a partial plan view of the tail end of a lathe showing a further form of holder in axial section.

Referring to Figure 1, the lathe includes a head stock 15, threaded spindle nose 16, ways 17 and 18, carriage 19, cross slide 20, and turret 21.

Reference numeral 22 designates a back or drive plate including a rearwardly projecting axial sleeve 23 having a bore whose rear portion 24 is smooth and whose forward portion is provided with threads 25 which project inwardly with respect to surface 16 so that the sleeve is threadable on the spindle nose 16 to jam against the spindle shoulder so that the rotation of the spindle is positively transmitted to the plate. The plate has a number of openings as at 26 spaced around its axis and preferably adjacent its periphery, these openings being parallel to the plate axis. Conveniently, there may be three of these openings equi-distantly spaced apart on equal radii.

Reference numeral 27 designates a chuck here shown as of the so-called self-centering type although it might be of the independent, or any other desired type. The chuck includes an integral flange constituting, as herein contemplated, part of a chuck mounting or driven plate 28 having a flat rear face in contact with the flat front face of the plate 22. Studs as at 29 are threaded into plate 28 from its rear face parallel to the clutch axis and in position to extend through the holes as at 26, the latter being of sufficient size to provide substantial clearance all around each of the studs. Rearwardly of plate 22 the studs 29 pass through holes in a ring 30 and have strung thereon springs as at 31 and washers 32 and 33, the former being engaged by nuts as at 34. The springs 31 are shown as single turn spirals of square section and may conveniently be constituted by lock washers with teeth filed flat. The stud threads engaged in plate 28 are of small pitch while those engaged by the nuts are of higher pitch so that the nuts will turn while the studs will remain stationary. Any other expedient may be used to maintain the studs against turning.

In the relation of parts shown in Figure 1, the nuts are somewhat loosened but the springs are still under substantial compression and maintain the opposed plate faces in frictional contact such that while plate 28 can be forced radially in any direction with respect to plate 22, plate 28 and the chuck will maintain any adjusted position against accidental displacement as, for example, by gravity. Engaged in the chuck is a piece 35 having an outside cylindrical surface. This piece may be an actual work piece or may be a master piece.

Mounted in the turret 21 is a bar 36 on which is rotatable a roller 37 on an axis parallel to the chuck axis and constituting a follower. While a roller follower is preferred, a simple finger of soft metal such as brass or other soft substance may be used.

With the carriage positioned so as to bring the follower opposite piece 35, the slide is advanced to bring the follower into contact with the piece. If the latter is off center, the pressure being exerted on it will cause plate 28 to slide on plate 22 and when upon continued radial pressure exerted through the follower the latter has continuous contact with the work piece, exact centering has been secured. Hereupon nuts 34 are tightened so that the springs are flattened and plate 28 is tightly engaged with plate 22 so that the holder becomes in effect an integral unit. The machine parts may then be manipulated to engage a tool as at 38, mounted in the turret, with the work.

It will be understood that in the case of inside work, the follower can just as readily be applied to an inside cylindrical surface.

Secured to the rear part of the slide through a base 39 is a pedestal 40 (see also Figure 2) which, at its upper end, carries a longitudinally adjustable horizontal bar 41 perpendicular to the chuck axis. Mounted in the forward end of the bar on an axis in the horizontal plane of and parallel to the spindle axis is a follower roller 42 which can be used in the same manner as the follower 37 in the centering operation. Bar 41 longitudinally adjustably supports a vertical rod 43 which, at its upper end, has an enlargement with a diametrical bore in which is engaged a rod 44 for longitudinal adjustment. At one end, rod 44 carries a test indicator 45 having a downwardly extending vertical feeler 46 whose point 47 is 90° in advance of the contact point of roller 42 on the arc of the work piece 35. Ordinarily rod 44 will extend parallel to bar 41 but, for clearness, is here shown as swung away. Until centering has been effected by the follower 42 the needle 48 of the test indicator will oscillate. When the pointer becomes stationary the operator knows that centering has been accomplished. The described use of a test indicator thus considerably simplifies the centering operation in that it eliminates the necessity for directly observing the nature of the contact between the follower and the work piece.

The described holder has assumed a threaded spindle nose by way of example. It will be understood that the back plate 22 can be appropriately designed for association with any type of spindle nose.

In the described holder, the chuck included an integral mounting plate 28. In the absence of such an integral plate, a separate mounting plate may be provided for association with a chuck in any appropriate manner. In Figures 3 to 5, I have shown a separate mounting plate adapted for threaded engagement with a chuck.

Referring to these figures, reference numeral 50 designates a back plate having a rearwardly projecting axial sleeve 51 with smooth and threaded portions 52 and 53 for engagement with a threaded spindle nose. The plate has a flat front face and is provided, near its periphery, with openings as at 54 which correspond to the openings as at 26 of the embodiment of Figure 1.

Reference numeral 55 designates a chuck mounting plate having a raised flat marginal portion 56 contacting the opposed face of plate 50. Plate 55 is provided with openings opposite openings 54 and of smaller diameter than the latter. Socket-headed screws 57 have shank portions passed through the plate openings and threaded into bushing nuts 58 fixed in openings in a clamp ring 59, the heads of the bolts being received in counter-bores in the front face of plate 55. As shown in Figure 3, the bolts are tightened so that a substantially unitary condition exists.

Plate 50 is provided between the openings 54 with openings 60 equally spaced apart and on equal radii. Plate 55 has opposed openings in which are fixed bushing nuts 61 and ring 59 has opposed openings through which are passed the shank or pin portions of socket-headed screws 62 threaded into nuts 61. The screw heads are received in counter bores in ring 59 and engage springs 63 which are preferably of the same form as springs 31 of the first embodiment. Bolts 57 being tightened, as above mentioned, springs 63 are not entirely flattened. Nuts 61, in which screws 52 are threaded, may be considered to form a part of the chuck mounting plate 55 and provide openings smaller than openings 60 in back plate 50.

Plate 55 has a forwardly extending hollow axial boss or sleeve 64 provided with external threads complementary to threads 53, being thus the same as the spindle nose threads, and threaded on the sleeve is a chuck 65 for drive thereby. It will be evident that elongated work pieces can be inserted through the hollow spindle and sleeve 64 to the chuck. The sleeve has a slight rearward internal taper and can be closed by a mating plug 66 to keep chips out of the holder when the work is being inserted from the front. As a further safeguard against chips, plates 50 and 55 are provided with opposed annular grooves 67 and 68 in which a readily distortable washer 69 is engaged, the washer being, for example, of neoprene sponge.

For the centering operation, bolts 57 are loosened, thereby transferring the plate connecting function to bolts 62 through springs 63. These bolts were so adjusted, and this adjustment may be permanent, that upon release of bolts 57, plates 50 and 55 are held in proper frictional engagement so that plate 55 can be forced universally radially of plate 50 and will retain any adjusted relation, such displacement being not substantially impeded by the readily distortable washer. The great advantage of the described arrangement is that since bolts 62 and associated springs will maintain the required floating effect, no care has to be taken to unloosen bolts 57 to any particular degree as is necessary in the first embodiment.

In use, the bolts tend to ride against the sides of the openings in plate 50. I, therefore, in preferred practice, provide greater clearance around bolts 57 than around bolts 62. Consequently, the sides of holes 54 can never come into a contact with bolts 57. If the latter contact were possible, it will be apparent that in case any of bolts 57 was to any extent out of round, its turning, in the tightening operation, could upset the centered relation. Since bolts 62 are not turned, this difficulty does not exist as to them. Consequently, the plates can be clamped together by bolts 57 without any danger of destroying the centered condition.

For the purpose of threading the holder on and off of the spindle, I provide plate 50 with radial slots 70 into which a bar can be inserted.

The back and mounting plates are ordinarily made of cast metal and in order to avoid excessive wear, they may include a number of opposed hard metal inserts as at 71 and 72, Figure 6, having slight projecting head portions with flat contacting surfaces.

At times it is required that the chuck be positioned in a considerably eccentric relation to the spindle axis, for example in machining the throw bearing of a crank shaft. In order to permit this, the back plate 22', Figure 7, is shown as being provided with parallel or aligned elongated slots 26' which take the place of the round holes 26 in Figure 1. The plate has edge slots 70' for engagement by an adjusting bar. The width of slots 26' is sufficient to afford centering clearance.

In the embodiments hereinbefore described, a sleeve is provided on the rear of the back plate and decreases the distance between centers by its length. In Figure 9, this is avoided by providing a neck or sleeve 73 which projects forwardly and is received with clearance all around in an opening or socket 74 in the mounting plate here shown as being an integral part of the chuck 75. A readily compressible gasket 76 made, for example, of neoprene sponge is engaged between the sleeve 73 and the surrounding wall of the socket. As in the preceding embodiment, the back plate has smooth and threaded bore portions designated at 77 and 78.

Referring to Figure 8, the chuck 80 is shown as having an integral mounting plate 81 which is rabbeted to provide a shoulder 82. The flat rear face of the mounting plate is in contact with the flat front face of a back plate 83 of larger diameter and peripherally threaded for engagement by a threaded clamping ring 84 having an inturned radial flange 85 opposed to shoulder 82. An annular dished spring 86 bears against the shoulder and against a ball bearing assembly 87 which, at its other side, bears against flange 85. The front face of the flange is constituted as a bevelled gear 88 engageable by the bevel wrench 89 whose pilot 90 is insertable in a radial bore in the chuck. With parts in the position shown, centering can be accomplished in the same manner as hereinbefore described and thereafter the wrench is operated to lock the plates together. The spacing of the shoulder 82 and assembly 87 is somewhat exaggerated in order to reveal the spring. Actually the necessary axial movement of the ring is very small and is easily accommodated by the meshing teeth.

The holders hereinbefore described are all particularly designed for application to a rotary shaft such as a lathe spindle. The holder of Figure 10 is designed for mounting on a fixed shaft.

Referring to that figure, a taper 95 is shown engaged in the tail stock 96 of a lathe. The projecting cylindrical extremity 97 of the taper is received in an axial bore 98 of a back plate 99 and interposed between portion 97 and the bore wall is an anti-friction bearing, here shown as a self-aligning ball bearing assembly 100. Back of portion 97 the taper has an annular flange 101 and between this and a sleeve portion 102 of the back plate is interposed a seal comprising a channel 105 and a leather 104 constricted by an annular coil spring 103 against the periphery of flange 101. In order to limit tilting of the back plate relative to the taper, the latter has threaded thereon a guard 106 which cooperates with the adjacent end of sleeve 102. As here shown, the guard is threaded against the rear face of flange 101 but shims may be interposed, if desired, to increase the permissible range of tilt. As here shown, the threaded tension members are constituted by cap screws as at 107 which pass through washers with interposed spring, a ring 108, enlarged openings as at 109 in the back plate, and are engaged in threaded holes in the mounting plate 110, here shown as an integral part of the chuck 111. With a cylindrical piece supported at one end in a spindle chuck and its other end in the chuck 111 and screws 107 being loosened, as shown, chuck 111 can be centered in the manner previously described.

It will be evident that the insert feature of Figure 6 can be used in all embodiments and that the elongated slot feature of Figure 7 is applicable in all embodiments except that of Figure 8. The chuck can be of any suitable type and if a separate mounting plate is used, it will have connecting means appropriate to the chuck. The back plate when designed for association with a rotary shaft will have coupling means appropriate to the situation. In Figure 10, the taper mounting is merely illustrative of a fixed supporting member for the back plate. The invention extends to modifications in the form and arrangement of parts coming under the following claims. In the claims, the word "chuck" is used as covering any type of holder for work to be rotated.

I claim:

1. A chuck holder comprising a back plate adapted for mounting on a supporting shaft for rotation, a chuck mounting plate in face to face relation with said back plate, threaded means spaced outwardly of the plate centers for holding the plates together, said plates having flat mutually contacting surfaces constituted by the surfaces of opposed hard inserts set in said plates, said holding means being tightenable to clamp said surfaces tightly together whereby to maintain said mounting plate against radial displacement relative to the back plate or being loosenable to permit such displacement on any radius, and spring means arranged around the plate centers and acting to hold said surfaces in frictional contact when said tension means is loosened so that said mounting plate can be forced radially relative to said back plate to center a chuck carried by said mounting plate, said frictional contact sufficing to maintain the chuck against accidental displacement.

2. A chuck holder comprising a back plate adapted for mounting on a supporting shaft for rotation, a chuck mounting plate in face to face relation with said back plate, said plates having a plurality of opposed openings therein arranged around their centers, threaded tension means including stem portions in said openings for holding said plates together, said plates having flat mutually contacting surfaces, the openings in one of said plates being large enough to provide clearance all around said stem portions, said tension means being tightenable to clamp said surfaces tightly together whereby to maintain said mounting plate against radial displacement relative to the back plate or being loosenable to permit such displacement on any radius, compression spring means arranged around the plate centers and acting to hold said surfaces in frictional contact when said tension means are loosened so that said mounting plate can be forced radially relative to said back plate to center a chuck carried by said mounting plate, said frictional contact sufficing to maintain the chuck against accidental displacement, and an annular gasket retained between the opposed faces of the plates around the plate centers and inwardly of said openings.

3. A chuck holder according to claim 2 wherein the opposed faces of the plates are provided with opposed annular grooves around the plate centers and inwardly of said openings, the gasket being received in said grooves and being readily distortable.

4. A chuck holder comprising a back plate adapted for mounting on a supporting shaft for rotation, a chuck mounting plate in face to face relation with said back plate, said plates having a set of opposed openings therein arranged around their centers, threaded tension means including stem portions in said openings for holding said plates together, said plates having flat mutually contacting surfaces, the openings in one of said plates being large enough to provide clearance all around said stem portions, said tension means being tightenable to clamp said surfaces tightly together whereby to maintain said mounting plate against radial displacement relative to the back plate or being loosenable to permit such displacement on any radius, said plates having a second set of openings therein arranged around their centers, pins in said openings and engaged with one of said plates and each having an abutment spaced outwardly of the other of said plates, the openings of said second set in one of said plates being large enough to provide clearance all around said pins, and compression springs acting to hold said surfaces in frictional contact when said tension means are loosened so that said mounting plate can be forced radially relative to said back plate to center a chuck carried by said mounting plate, said abutments maintaining said springs under compression when said tension means are excessively loosened, whereby to insure frictional contact sufficing to maintain the chuck against accidental displacement, said clearance around said stem portions being greater than said clearance around said pins.

5. A chuck holder comprising a back plate member adapted for mounting on a supporting shaft for rotation, a chuck mounting plate member in face to face relation with said back plate member, said members having flat contacting surfaces, said members having a plurality of opposed openings therein arranged around their centers, the openings in one of said members being larger than those in the other, a ring member on the opposite side of said one of said plate members and having openings opposed to the openings of said plate members, threaded members engaged with said other plate member and including stem portions in said openings and heads outwardly of said ring member, said larger openings providing clearance around said stem portions, and spiral compression springs surrounding said stem portions between said heads and ring member and urging said plate members together.

6. A chuck holder comprising a back plate member adapted for mounting on a supporting shaft for rotation, a chuck mounting plate member in face to face relation with said back plate member, said members having flat contacting surfaces, said members having a plurality of opposed openings therein arranged around their centers, the openings in one of said members being larger than those in the other, a ring member on the opposite side of said one of said plate members and having openings opposed to the openings of said plate members, threaded members engaged with said other plate member and including stem portions in said openings and heads outwardly of said ring member, said larger openings providing clearance around said stem portions, spiral compression springs surrounding said stem portions between said heads and ring member and urging said plate members together, and means other than said threaded members operable to clamp the plate members together while permitting relative sliding movement thereof when unclamped.

7. Structure according to claim 5 wherein said springs have single turns so as to be flattenable.

8. A chuck holder according to claim 5 in which the shaft is non-rotatably supported, in which the back plate member has an axial bore receiving said shaft, and in which anti-friction bearing means are interposed between the shaft and the wall of said bore, for rotation of the back plate relative to the shaft.

9. A chuck holder according to claim 5 in which the shaft is non-rotatably supported, in which the back plate member has an axial bore receiving the shaft, and in which a self-aligning ball bearing assembly is interposed between the shaft and the wall of said bore, for rotation of the back plate relative to the shaft.

10. A chuck holder in accordance with claim 5 in which the chuck mounting plate member is provided with a central socket, and in which the back plate has an axial sleeve extending forwardly thereof into said socket with clearance all around the same.

11. A chuck holder in accordance with claim 10 in which a readily compressible gasket is engaged between said sleeve and the surrounding wall of the socket.

12. A chuck holder in accordance with claim 5 in which the openings in one of said plate members are elongated in parallel relation to a common line.

THEO. O. STRAUSS.

REFERENCES CITED

The following references are of record in the file of this patent:

UNITED STATES PATENTS

| Number | Name | Date |
|---|---|---|
| 158,007 | Toothaker | Dec. 22, 1874 |
| 233,097 | Hopkins | Oct. 12, 1880 |
| 289,867 | Sawyer | July 10, 1883 |
| 981,062 | Casler | Jan. 10, 1911 |
| 1,051,531 | Whipple | Jan. 28, 1913 |
| 1,765,624 | Scusa | June 24, 1930 |
| 1,868,435 | Sowden | July 19, 1932 |
| 1,947,198 | Gable | Feb. 13, 1934 |
| 2,162,246 | Cote | June 13, 1939 |
| 2,311,258 | Sjogren | Feb. 16, 1943 |
| 2,329,382 | Blazek | Sept. 14, 1943 |
| 2,420,502 | Spira | May 13, 1947 |

FOREIGN PATENTS

| Number | Country | Date |
|---|---|---|
| 339,643 | Germany | July 29, 1921 |
| 549,225 | Germany | Apr. 25, 1932 |
| 696,962 | Germany | Oct. 3, 1940 |